United States Patent
Choi et al.

(10) Patent No.: US 10,013,127 B2
(45) Date of Patent: Jul. 3, 2018

(54) TOUCH PANEL AND IMAGE DISPLAY DEVICE INCLUDING THE SAME

(71) Applicant: DONGWOO FINE-CHEM CO., LTD., Jeollabuk-do (KR)

(72) Inventors: Byung Jin Choi, Gyeonggi-do (KR); Jae Hyun Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 15/256,799

(22) Filed: Sep. 6, 2016

(65) Prior Publication Data
US 2017/0068382 A1 Mar. 9, 2017

(30) Foreign Application Priority Data
Sep. 3, 2015 (KR) .......................... 10-2015-0124918

(51) Int. Cl.
*G06F 3/041* (2006.01)
*G06F 3/044* (2006.01)

(52) U.S. Cl.
CPC .............. *G06F 3/044* (2013.01); *G06F 3/041* (2013.01); *G06F 2203/04103* (2013.01)

(58) Field of Classification Search
CPC . G06F 3/044; G06F 3/041; G06F 2203/04103
See application file for complete search history.

(56) References Cited

U.S. PATENT DOCUMENTS

| | | | | |
|---|---|---|---|---|
| 2003/0222334 A1* | 12/2003 | Ikeda | .................. | G02F 1/13454 257/678 |
| 2014/0063362 A1* | 3/2014 | Di | .......................... | G06F 1/182 349/12 |
| 2014/0268275 A1* | 9/2014 | Brosnihan | ............... | B81B 7/008 359/230 |
| 2014/0320765 A1* | 10/2014 | Jiang | ...................... | G06F 3/041 349/12 |
| 2015/0181338 A1* | 6/2015 | Hosoi | .................... | H04R 5/033 381/309 |
| 2015/0193065 A1* | 7/2015 | Hsieh | .................... | G06F 3/0412 345/174 |
| 2016/0240605 A1* | 8/2016 | Lee | ...................... | H01L 27/3276 |
| 2017/0062528 A1* | 3/2017 | Aoyama | ............... | H01L 27/322 |
| 2017/0153724 A1* | 6/2017 | Hsieh | ...................... | G06F 3/041 |
| 2017/0271617 A1* | 9/2017 | Choi | .................. | H01L 27/3244 |

FOREIGN PATENT DOCUMENTS

KR 10-2012-0067795 A 6/2012

* cited by examiner

*Primary Examiner* — Erin M File
(74) *Attorney, Agent, or Firm* — The PL Law Group, PLLC (57) ABSTRACT

A touch panel includes a display region and conductive pad parts in which a portion thereof is exposed to a display region, wherein the conductive pad parts have a plurality of holes formed in at least a region including the exposed portion thereof. The touch panel is capable of significantly reducing an area of a non-display region, has excellent visibility of an image to be displayed by reducing visibility of a conductive pad part exposed in a display region, and has significantly reduced damage in a manufacturing process by preventing an occurrence or propagation of cracks.

17 Claims, 10 Drawing Sheets

TOUCH PANEL AND IMAGE DISPLAY DEVICE INCLUDING THE SAME

CROSS REFERENCE TO RELATED APPLICATIONS AND CLAIM OF PRIORITY

The application claims the benefit of Korean Patent Application No. 10-2015-0124918, filed on Sep. 3, 2015, at the Korean Intellectual Property Office, the disclosures of which are incorporated herein in their entirety by reference.

BACKGROUND

1. Field of the Invention

The present invention relates to a touch panel and an image display device including the same.

2. Description of the Related Art

Recently, due to a rapid growth of techniques relating to an image display device, flat panel displays (FPDs) such as a liquid crystal display (LCD), field emission display (FED), plasma display panel (PDP), organic light emitting diode (OLED), and the like have been developed.

A flat display panel may be divided into a display region configured to display an image and a non-display region surrounding the display region. The display region is provided with pixels defined by intersecting gate lines and data lines with each other, and the non-display region is provided with data pads and gate pads formed at ends of the gate lines and the data lines, respectively, so as to transmit/receive an electrical signal to/from a driving device. The driving device includes a chip or a substrate for driving the flat display panel, for example, a driving integrated circuit (D-IC), a flexible printed circuit board (FPCB), and the like.

Enlarging the display region on which the image is displayed relative to an entire area of the image display device has recently become the main interest. Accordingly, researches for gradually reducing a width of the non-display region (a bezel part) have been conducted. However, a minimum space for installing conductive pad parts and wirings disposed in the non-display region is required, and thus a reduction in the non-display region is limited.

In addition, when a lower portion of the conductive pad part is formed of a soft material, in a process of manufacturing or treating the display, the lower portion of the conductive pad part may be bent to cause failures, e.g., cracks in the conductive pad to cause damages therein.

Korean Patent Laid-Open Publication No. 2012-0067795 discloses a flat display panel including a first pad which is formed by protruding from one side edge of an upper substrate while integrating signal lines formed on the upper substrate, and a second pad which is formed by protruding from one side edge of a lower substrate while integrating signal lines formed on the lower substrate, however, fails to suggest an alternative solution to solve the above-described problem.

SUMMARY

Accordingly, it is an aspect of the present invention to provide a touch panel which is capable of significantly reducing an area of a non-display region.

In addition, another aspect of the present invention is to provide a touch panel having excellent visibility of an image to be displayed, by reducing visibility of a conductive pad part exposed in a display region.

Further, another aspect of the present invention is to provide a touch panel having significantly reduced damage in a manufacturing process, by preventing an occurrence or propagation of cracks.

Furthermore, another aspect of the present invention is to provide an image display device including the above touch panel.

The above-mentioned aspects of the present invention will be achieved by one or more of the following characteristics:

(1) A touch panel including: conductive pad parts in which a portion thereof is exposed to a display region, wherein the conductive pad parts have a plurality of holes formed in at least a region including the exposed portion thereof.

(2) The touch panel according to the above (1), wherein the plurality of holes are arranged on a plurality of straight lines extending between one end and the other end of the conductive pad part.

(3) The touch panel according to the above (2), wherein the plurality of holes are regularly or irregularly arranged so that any straight line extending between one end and the other end of the conductive pad part meets with at least one hole of the plurality of holes.

(4) The touch panel according to the above (1), wherein a total area of the plurality of holes in the portion of the conductive pad parts exposed to the display region is 30% to 90%, relative to a total area of the exposed conductive pad parts.

(5) The touch panel according to the above (1), wherein the conductive pad part includes a groove.

(6) The touch panel according to the above (5), wherein the groove is formed along any straight line extending between one end and the other end of the conductive pad part.

(7) The touch panel according to the above (6), wherein the groove is formed along a plurality of holes which are arranged along any straight line of the conductive pad part.

(8) The touch panel according to the above (1), wherein the conductive pad part is formed of a material including at least one of a metal, a conductive metal oxide, and a conductive carbon.

(9) The touch panel according to the above (1), wherein the conductive pad part includes a metallic core part and a conductive nonmetallic coating layer.

(10) The touch panel according to the above (9), wherein the metallic core part is formed to include a plurality of layers.

(11) The touch panel according to the above (9), wherein the conductive nonmetallic coating layer is formed to include a plurality of layers.

(12) The touch panel according to the above (1), wherein the conductive pad part further includes an insulation layer on an upper side thereof.

(13) The touch panel according to the above (12), wherein the insulation layer is formed to include a plurality of layers.

(14) The touch panel according to the above (1), wherein the conductive pad parts are connected with position sensing lines, a portion of the position sensing lines is exposed in the display region, and
the position sensing lines have a plurality of holes formed in at least a region including the exposed portion thereof.

(15) The touch panel according to the above (1), further including dummy parts adjacent to the conductive pad parts, wherein a portion of the dummy parts is exposed in the display region, and a plurality of holes are formed in at least a region including the exposed portion thereof.

(16) The touch panel according to the above (1), wherein the conductive pad parts are electrically connected with touch sensing electrode patterns formed in the display region.

(17) An image display device including the touch panel according to any one of the above (1) to (16).

(18) The image display device according to the above (17), wherein the image display device is selected from a liquid crystal display (LCD), field emission display (FED), plasma display panel (PDP), organic light emitting diode (OLED) or touch screen.

According to the present invention, due to a reduction of the non-display region, it is possible to significantly increase an area of the display region relative to an entire area of the touch panel.

In addition, according to the present invention, by reducing the visibility of the conductive pad part exposed in the display region, it is possible to prevent a deterioration of an image to be displayed.

Further, according to the present invention, a pressure applied to the conductive pad part may be dispersed to prevent an occurrence or propagation of cracks while realizing excellent flexibility.

Furthermore, according to the present invention, due to a prevention of the occurrence or propagation of cracks, it is possible to reduce damages in a manufacturing process, while increasing the life-span of products.

Thus, a touch panel having rapid response speed and high sensitivity may be achieved by preventing and/or reducing cracks in the conductive pad part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION

The present invention provides a touch panel including conductive pad parts in which a portion thereof is exposed in a display region, wherein the conductive pad parts have a plurality of holes formed in at least a region including the exposed portion thereof, such that visibility of the conductive pad parts which are disposed in the display region may be reduced. Thus, even though a width of a non-display region (including, e.g., bezel part) is reduced, a deterioration or reduction of the visibility due to an exposure of the conductive pad parts may be prevented. An image display device including the touch panel may be also provided.

Hereinafter, exemplary embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

<Display Region and Non-display Region>

The touch panel of the image display device is divided or classified into a display region to display an image and a non-display region surrounding the display region. The display region is a region on which an image to be displayed is viewed and is provided with pixels defined by intersecting gate lines and data lines with each other, and the non-display region is provided with data pads and gate pads (conductive pad parts) respectively formed at ends of the gate lines and the data lines, so as to transmit/receive an electrical signal to/from a driving device.

Further, in a case of a touch panel (touch screen panel) including touch sensing electrode patterns, the touch sensing electrode patterns are formed in the display region, and the conductive pad parts electrically connected with one ends of the touch sensing electrode patterns are formed in the non-display region, so as to transfer a sensing signal to an external circuit through position sensing lines connected to the other end of the conductive pad parts.

Enlarging the display region on which the image is displayed relative to the area of the image display device has recently become the main issue. Accordingly, researches for gradually reducing a width of the non-display region (bezel part) have been conducted.

However, a minimum space for installing the conductive pad parts and wirings disposed in the non-display region is required, and thus a reduction in the non-display region is limited.

In order to solve the above-described problem, an alternative of exposing a portion of the conductive pad parts disposed in the non-display region to the display region may be considered. However, the conductive pad parts of the non-display region are normally formed of a metal which is not substantially transparent. Therefore, when exposing the conductive pad parts to the display region, visibility of the image displayed by the image display device may be degraded.

To solve the above-described problem, the touch panel of the present invention includes conductive pad parts a portion of which is exposed in the display region due to a reduction of the area of the non-display region. A plurality of holes is formed in at least a region including the exposed portion thereof, such that visibility of the conductive pad parts is significantly reduced.

Figure 1:
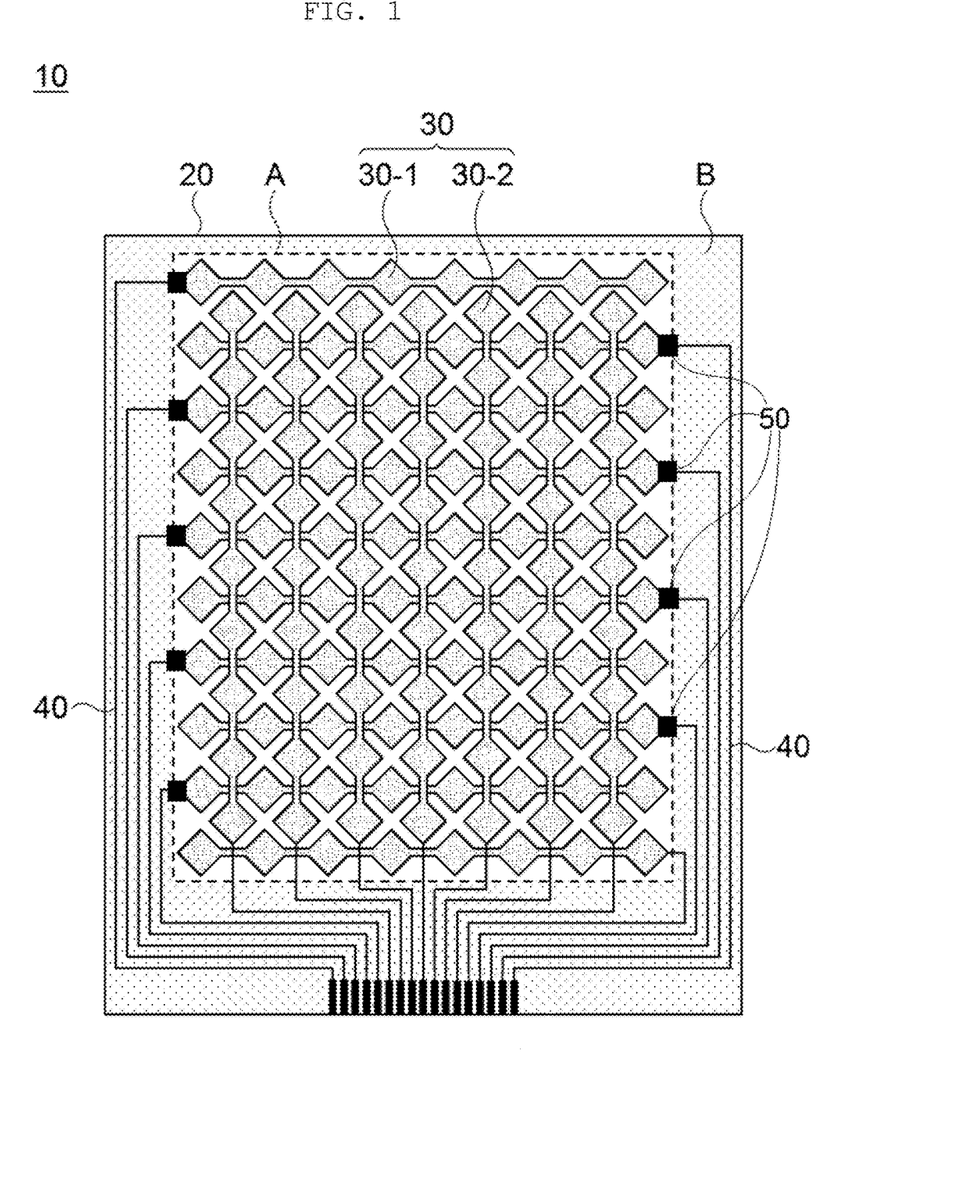
FIG. 1 is a top plan view schematically illustrating an electrode construction of a touch panel according to one embodiment of the present invention.

FIG. 1 is a top plan view schematically illustrating an example of an electrode construction of the touch screen panel. Hereinafter, embodiments of the present invention will be described based on the same, but the present invention is not particularly limited thereto.

Referring to FIG. 1, a touch screen panel 10 includes a display region A and a non-display region B. The display region A and the non-display region B may be formed on a transparent substrate 20. The display region A is surrounded by the non-display region B of the touch screen panel 10. The display region A has sensing electrode patterns 30 formed thereon and configured to sense an electrical or physical change by touch of a user. The sensing electrode patterns 30 include first sensing electrode patterns 30-1 and second sensing electrode patterns 30-2. The first sensing electrode patterns 30-1 and the second sensing electrode patterns 30-2 are regularly formed in a rhombic shape to be adjacent to each other on the transparent substrate 20. In this case, the first sensing electrode patterns 30-1 are formed on the transparent substrate 20 in a plurality of rows, and the second sensing electrode patterns 30-2 are formed on the transparent substrate 20 in a plurality of columns.

The non-display region B includes position sensing lines 40 and conductive pad parts 50 formed therein. One ends of the position sensing lines 40 are respectively connected to the first sensing electrode patterns 30-1 formed in the plurality of rows and the second sensing electrode patterns 30-2 formed in the plurality of columns. The other ends of the position sensing lines 40 are electrically connected to the conductive pad parts 50. In addition, the conductive pad parts 50 are connected with an external driving circuit.

The conductive pad part 50 may have a wider area or section than that of the wirings to increase reliability of the electrical connection, thus may be easily exposed in the display region A.

<Conductive Pad Part>

The touch panel of the present invention includes the conductive pad part 50 a portion of which is exposed in the display region A, and a plurality of holes are formed in at least a region including the exposed portion of the conductive pad part 50.

Figure 2:
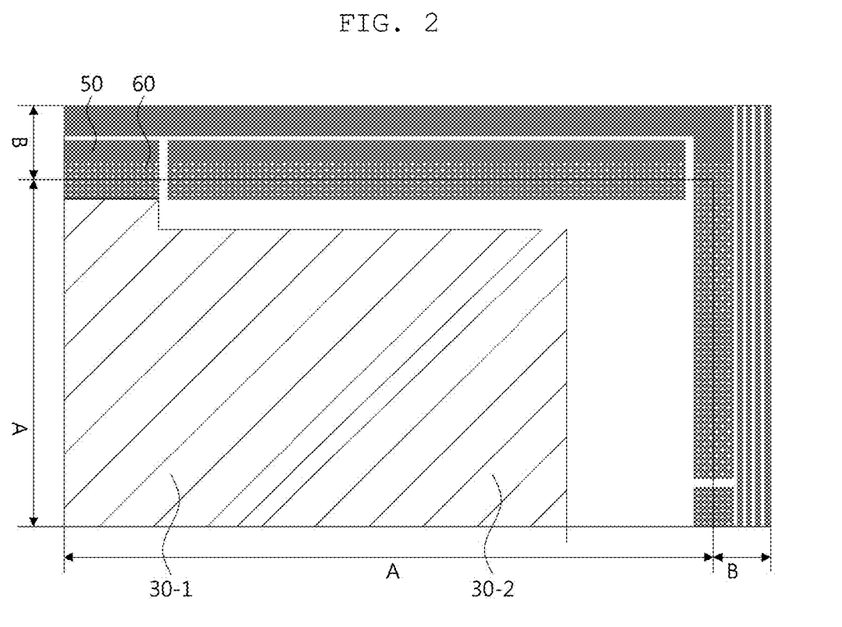
FIG. 2 is a view schematically illustrating a portion of a touch panel according to one embodiment of the present invention.

FIG. 2 is an enlarged view illustrating a portion of the touch panel according to one embodiment of the present invention Referring to FIG. 2, a portion of the conductive pad part 50 is also disposed in the display region A due to an enlargement of the display region A. In this case, the touch panel of the present invention includes the conductive pad part 50 having a plurality of holes 60 formed in a region including the exposed portion thereof, thereby reducing visibility of the conductive pad part 50.

Other laminates may be formed on upper and lower sides of the conductive pad part 50. When forming the laminates through applying a photo-curable composition and light-irradiating thereon, the laminates may be more easily formed on the conductive pad part 50.

The reason is that, the light is transmitted through the plurality of holes arranged in the conductive pad part 50, such that a photo-polymerization curing reaction may be easily performed by the photo-curable composition, and thereby improving workability efficiency. In addition, when irradiating a rear surface of the conductive pad part 50 with the light, an amount of reflected light may be reduced by the holes, such that the photo-polymerization curing reaction may be stably performed.

Meanwhile, conventionally, when the lower portion of the conductive pad part 50 is formed of a soft material, the lower portion may be bent during fabricating or treating the display device to result in damages such as cracks in the conductive pad part 50.

According to embodiments of the present invention, a pressure applied to the conductive pad part 50 may be dispersed through the plurality of the holes 60 included in the conductive pad part 50 so that cracks in the conductive pad part 50 may be prevented or reduced. Thus, the touch panel of the present invention may be effectively employed in a flexible display.

FIGS. 3 to 9 are enlarged views illustrating a portion of the conductive pad part 50 according to other embodiments of the present invention.

According to one embodiment of the present invention, the plurality of holes 60 may have a circular or polygonal shape, but the shape of the holes 60 is not specifically limited.

Figure 3:
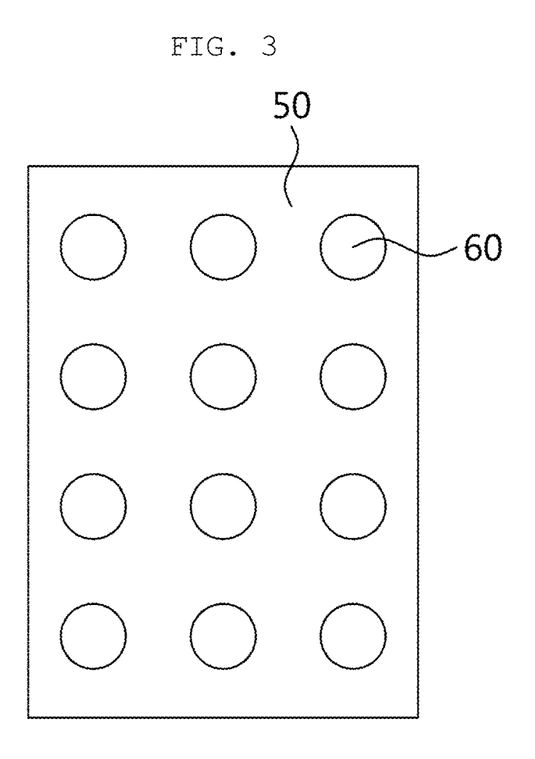
FIGS. 3 to 9 are views schematically illustrating conductive pad parts of touch panels according to other embodiments of the present invention.

An arrangement or configuration of the plurality of holes may not be specifically limited. According to one embodiment of the present invention, the plurality of holes 60 may be arranged along a plurality of straight lines extending between one end and the other end of the conductive pad part 50. FIG. 3 schematically illustrates an implementation in which the holes 60 are arranged along a straight line.

According to another embodiment of the present invention, when the plurality of holes 60 are arranged along a plurality of straight lines extending between one end and the other end of the conductive pad part 50, the plurality of holes 60 may be regularly or irregularly arranged so that any straight line extending between one end and the other end of the conductive pad part 50 meets with at least one hole 60. In this case, even though cracks occur at any position, a probability in which the cracks meet with at least one of the holes 60 may become greater, so that a propagation of the cracks may be significantly avoided or blocked.

Figure 4:
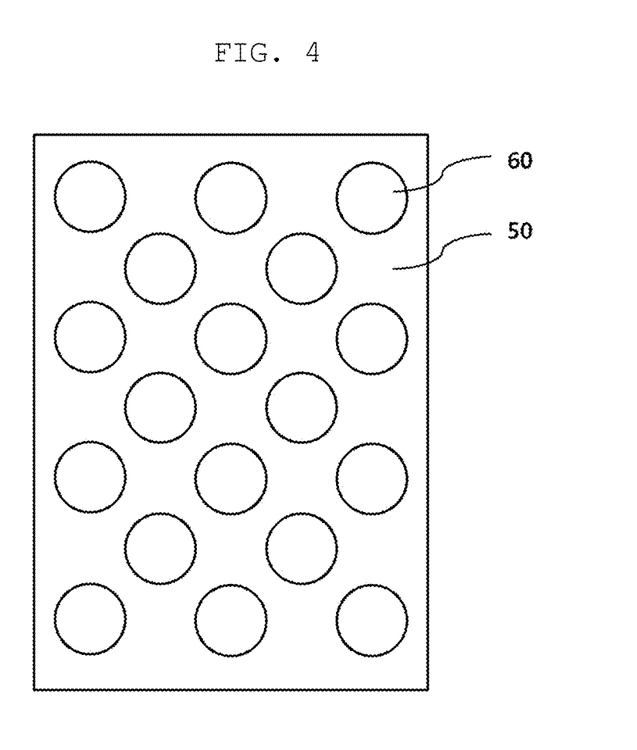
Figure 5:
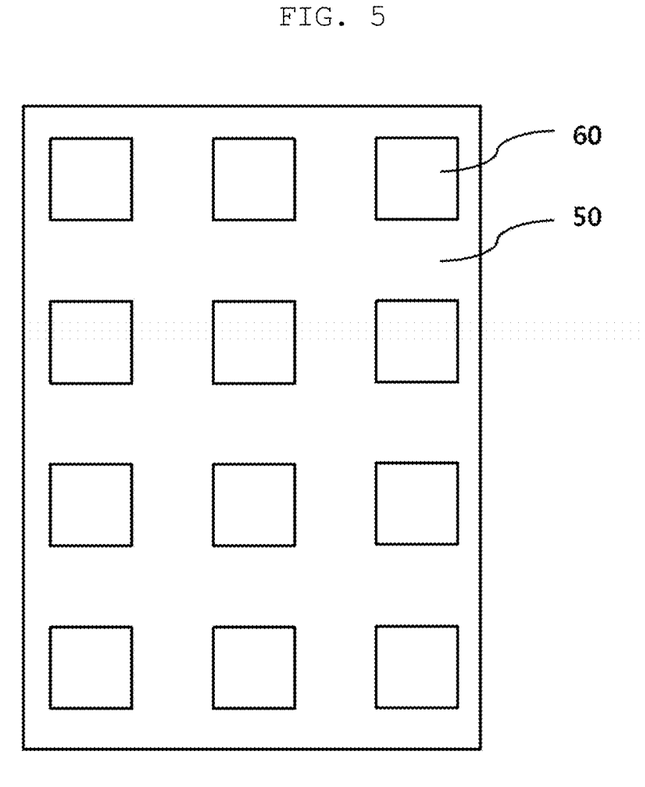
Figure 6:
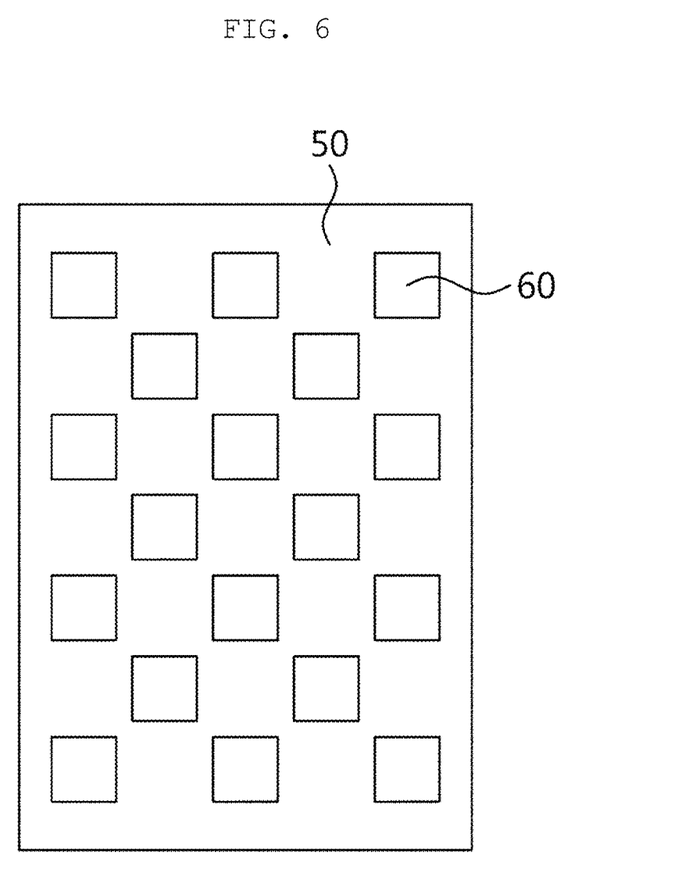
Figure 7:
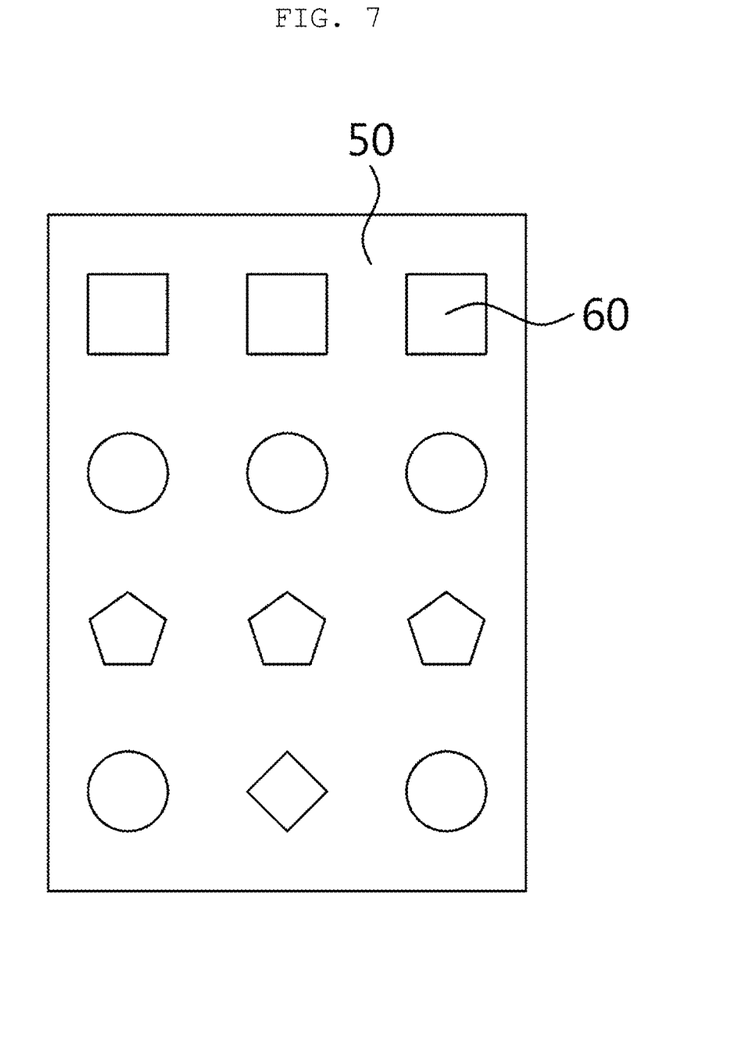
Figure 8:
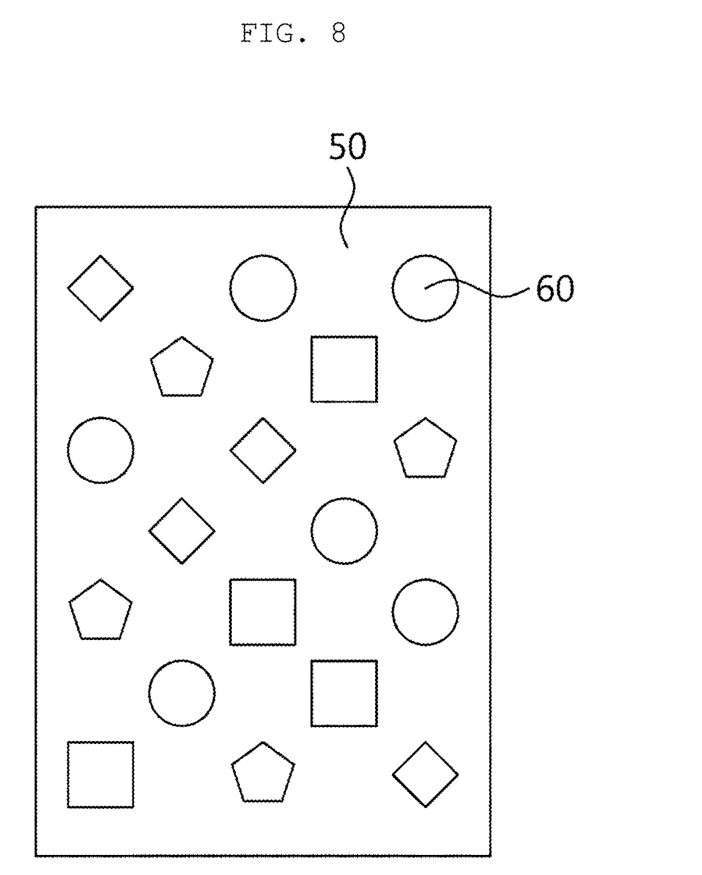

FIG. 4 schematically illustrates an example in which the plurality of holes 60 are arranged so that any straight line extending between one end and the other end of the conductive pad part 50 meets with at least one hole 60. As illustrated in FIG. 4, the plurality of holes 60 may be arranged alternately with each other to prevent the diffusion of cracks effectively.

According to embodiments of the present invention, the plurality of holes 60 may be formed in proper size and number. For example, a total area of the plurality of holes 60 formed in a portion of the conductive pad part 50 exposed in the display region A may be between about 30% and about 90% of an area of the portion of the conductive pad part 50 exposed in the display region A, preferably, between about 40% and about 80%. In the above-mentioned range, visibility of the conductive pad part 50 may be effectively reduced, and an occurrence or propagation of cracks may be prevented without decreasing connection reliability and electrical conductivity.

The shape of the holes 60 may be suitably selected or modified, and may be a circle or polygon such as a triangle, quadrangle, octagon, but not limited thereto.

According to one embodiment of the present invention, the conductive pad part 50 may include a groove 90 (see FIG. 9), and the conductive pad part 50 may achieve a flexibility so that an occurrence or propagation of cracks in the conductive pad part 50 may be prevented or reduced. In this regard, it is preferable that the grooves 90 are formed in a direction in which the conductive pad part 50 is frequently bent during treating or fabricating the same, or in a direction in which the cracks occur or propagate.

Figure 9:
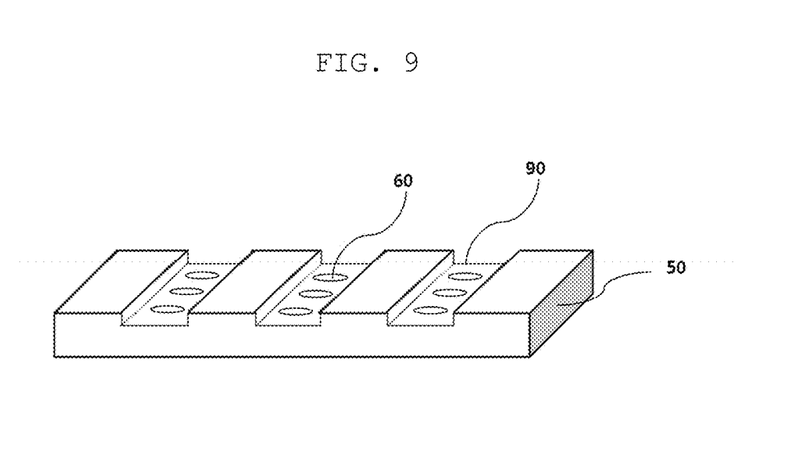

In one embodiment of the present invention, the groove 90 may be formed along any straight line extending between one end and the other end of the conductive pad part 50, and in another embodiment of the present invention, the groove 90 may be formed along the plurality of holes 60 which are arranged along any straight line on the conductive pad part 50. FIG. 9 illustrates an example in which the groove 90 are formed along the plurality of holes 60 which are arranged along any straight line on the conductive pad part 50.

A method of forming the groove 90 in the conductive pad part 50 is not particularly limited within a range not departing from the purpose of the present invention.

For example, when manufacturing the conductive pad part 50 by a photo-lithography process, the groove 90 may be formed using a half-tone mask (HTM). The HTM may implement a selective exposure of photoresist and may induce a difference in a height of patterns by differently adjusting an intensity of light transmitting through different regions. The groove may be formed using the HTM according to the above-described mechanism.

A material of the conductive pad part 50 may include any material having excellent electrical conductivity. For example, the conductive pad part 50 may be formed of at least one of a metal, a conductive metal oxide, and a conductive carbon.

The metal may be, for example, silver (Ag), gold, aluminum, molybdenum, copper, chromium, neodymium and an alloy thereof, the conductive metal oxide may be, for example, indium tin oxide (ITO), indium zinc oxide (IZO), Al-doped ZnO (AZO) and transparent conductive oxide (TCO), etc., and the conductive carbon may be, for example, carbon nanowire, carbon nanotube (CNT), graphene, etc. These materials may be used alone or in combination thereof.

According to one embodiment of the present invention, the conductive pad part 50 may include a metallic core part, and a conductive nonmetallic coating layer.

The metallic core part includes the above-described plurality of holes formed therein, and may be formed in a single layer or in a plurality of layers.

The conductive nonmetallic coating layer may optionally include the above-described plurality of holes formed therein, and may be formed in a single layer, or may be formed in a plurality of layers.

When using the metal as the material of the conductive pad part 50, corrosions may be caused therein. Thus, it is preferable that the conductive pad part 50 includes the conductive nonmetallic coating layer. The conductive nonmetallic coating layer may be formed of a material including at least one of the above-described conductive metal oxide, and conductive carbon.

The conductive metal oxide may include the above-described ITO, IZO, AZO and TCO, but not specifically limited thereto. These materials may be used alone or in combination thereof.

The above-described carbon nanowires, carbon nanotubes (CNT), graphene, etc., may be used as the conductive carbon, but not particularly limited thereto. These materials may be used alone or in combination thereof.

According to one embodiment of the present invention, the conductive pad part 50 may further include an insulation layer on an upper side thereof.

The insulation layer may be formed in a single layer or in a plurality of layers.

When the conductive pad part 50 of the present invention further includes the insulation layer, a pressure applied to the conductive pad part 50 may be effectively dispersed or scattered through a buffering effect of the insulation layer, to reduce or prevent an occurrence of cracks in the conductive pad part.

A material of the insulation layer may include any material commonly used in the related art without particular limitation thereof. For example, inorganic insulating materials such as silicon oxide, silicon nitride, etc., or organic insulating materials such as a photo-curable resin composition may be used.

According to one embodiment of the present invention, the metallic core part and the conductive nonmetallic coating layer may be formed in a plurality of layers, respectively.

According to one embodiment of the present invention, the metallic core part includes the above-described plurality of holes formed therein, and the conductive nonmetallic coating layer may or may not include the plurality of holes formed therein.

When forming the conductive nonmetallic coating layer through processes of applying a photo-curable composition thereon and irradiating a light, the light is transmitted through the plurality of holes 60 arranged in the conductive pad part 50, so that the photo-polymerization curing reaction may be easily performed in the photo-curable composition.

Figure 10:
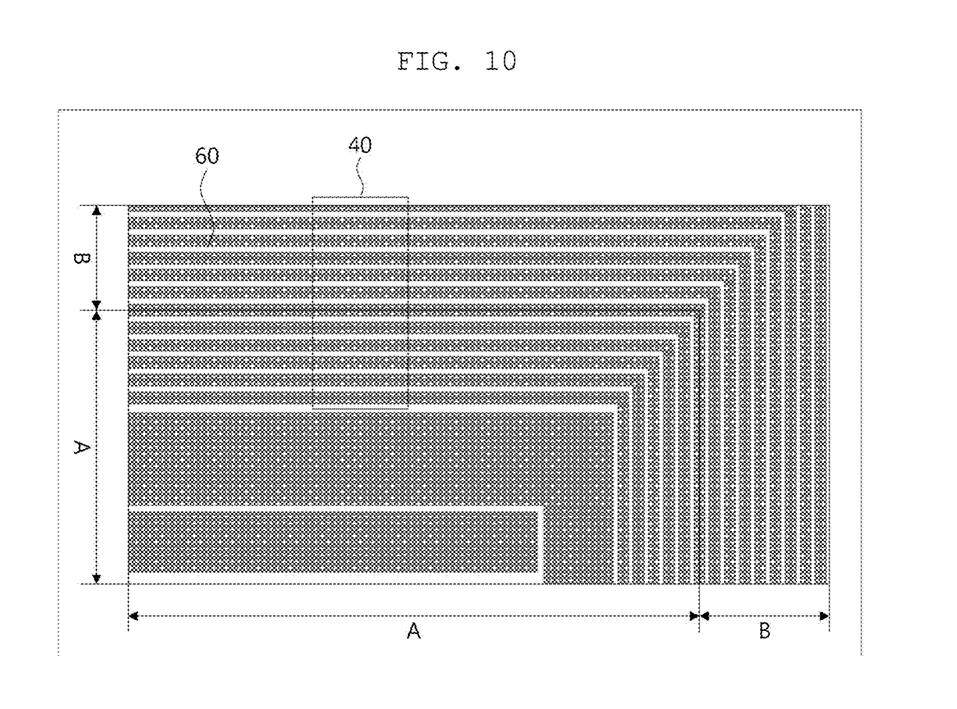
FIG. 10 is an enlarged view of position sensing lines of the touch panel according to one embodiment of the present invention.

According to another embodiment of the present invention, the touch panel may further include the position sensing lines 40 connected with the conductive pad part 50.

FIG. 10 is an enlarged view schematically illustrating the touch panel including the position sensing lines 40 according to one embodiment of the present invention. The position sensing lines 40 are connected to the conductive pad parts 50, and a portion thereof may be exposed in the display region A.

Accordingly, the position sensing lines 40 include the plurality of holes 60 formed in at least a region including the portion exposed in the display region A, so that the visibility of the position sensing lines 40 may be reduced.

In the present invention, the plurality of holes 60 of the position sensing lines 40 exposed in the display region A may be formed in a suitable size and number. For example, a total area of the plurality of holes 60 formed in the portion of the position sensing lines 40 exposed in the display region A may be between about 30% and about 90%, and preferably, between about 45% and about 70%, of a total area of the exposed position sensing lines 40. In the above-mentioned range, the visibility of the position sensing lines 40 may be effectively reduced, and an occurrence or propagation of cracks may be prevented without decreasing connection reliability and electrical conductivity.

Figure 11:
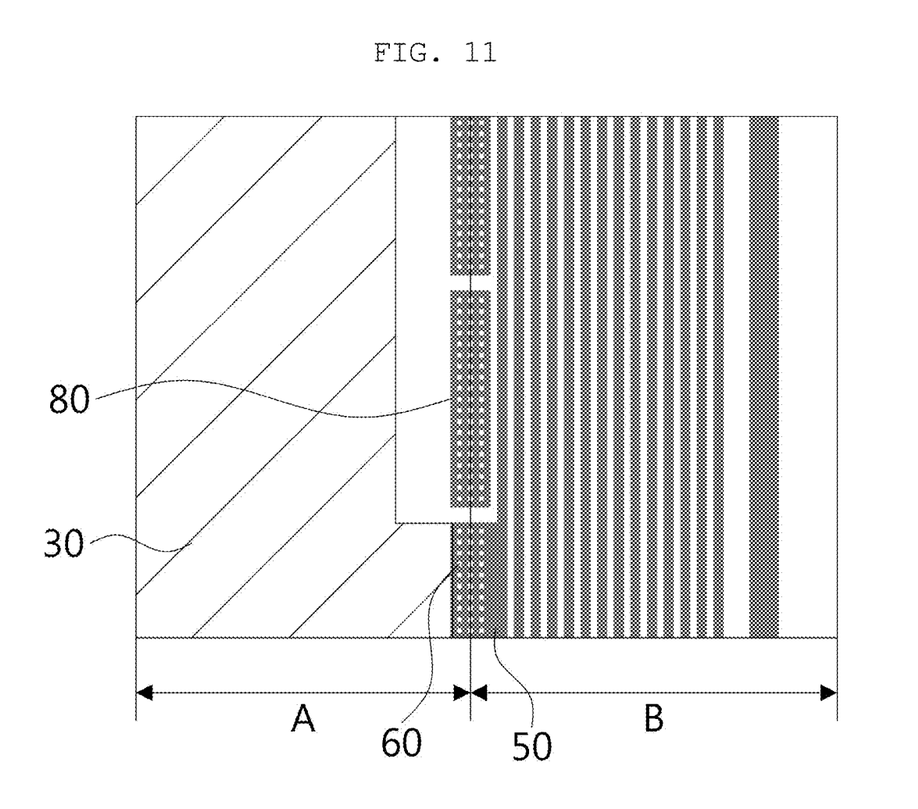
FIG. 11 is an enlarged view of dummy parts of the touch panel according to one embodiment of the present invention.

The touch panel according to another embodiment of the present invention may further include dummy parts 80 adjacent to the conductive pad parts 50.

FIG. 11 is an enlarged view schematically illustrating the dummy parts 80 included in the touch panel according to one embodiment of the present invention.

In order to reduce visibility due to a transmittance difference generating when regions with and without the conductive pad part 50 are adjacent to each other, the dummy parts 80 are formed of the same material as that of the conductive pad parts 50 adjacent to the conductive pad parts 50. When the conductive pad parts 50 are exposed in the display region A, the dummy parts 80 may be also exposed in the display region A. For example, in order to maximize a visibility reduction of the dummy parts 80 and the conductive pad parts 50, the dummy parts 80 may be formed in such a manner that a boundary line of the conductive pad parts 50 with the display region A lies on a boundary line of the dummy parts 80 with the display region A.

Further, in an embodiment of the present invention, the dummy parts 80 have the plurality of holes 60 formed in at least a region including the portion exposed in the display region A thereof, such that the visibility of the dummy parts 80 may be reduced.

In the present invention, the plurality of holes 60 of the dummy parts 80 exposed in the display region A may be formed in a suitable size and number. For example, the plurality of holes 60 may be formed so that a total area thereof in the portion of the dummy parts 80 exposed in the display region A may be between about 30% and about 90%, and preferably, between about 40% to 80%, relative to a total area of the exposed dummy parts 80. In the above-mentioned range, the visibility of the dummy parts 80 may be effectively reduced, and an occurrence or propagation of cracks may be prevented without decreasing connection reliability and electrical conductivity.

The shapes of the holes 60 in the position sensing lines 40 and the dummy parts 80 may be substantially the same as that of the conductive pad part 50.

Further, the present invention provides an image display device including the touch panel. The image display device of the present invention may be effectively implemented to flat panel displays such as a liquid crystal display (LCD), field emission display (FED), plasma display panel (PDP), organic light emitting diode (OLED), touch screen, etc.

For example, when the image display device of the present invention is the touch screen, the lower substrate may include a film, glass, a plastic material, and the like, without particular limitation thereof, and an upper protective layer may be formed of, e.g., an organic insulating film, inorganic insulating film, optical clear adhesive (OCA) film, optical clear resin (OCR), and the like, without particular limitation thereof.

Further, touch patterns included in the touch panel may include any pattern commonly used in the related art without particular limitation thereof within a range not departing from the purpose of the present invention.

Hereinafter, preferred embodiments will be described to more concretely understand the present invention with reference to examples. However, it will be apparent to those skilled in the art that such embodiments are provided for illustrative purposes and various modifications and alterations may be possible without departing from the scope and spirit of the present invention, and such modifications and alterations are duly included in the present invention as defined by the appended claims.

EXAMPLE 1

As illustrated in FIG. 11, a touch panel was manufactured by enlarging a display region A during manufacturing the touch panel so that a portion of the conductive pad parts 50 was exposed in the display region A, and dummy parts 80 were formed at the portion in which the conductive pad part 50 was not formed. A plurality of holes 60 were formed in the conductive pad parts 50 and the dummy parts 80, respectively.

The conductive pad parts 50 and the dummy parts 80 were formed of Ag (a core part), and an ITO coating layer was formed thereon.

A total area ratio (%) of the holes in the portion of the conductive pad parts 50 exposed in the display region A was 30% relative to a total area of the exposed conductive pad parts 50, and a total area ratio of the holes in the portion of the dummy parts 80 exposed in the display region A was 30% relative to a total area of the exposed conductive dummy parts 80.

EXAMPLES 2 AND 3, AND COMPARATIVE EXAMPLE 1

Touch panels were manufactured according to the same procedures as those described in Example 1, except that the holes thereof were formed so as to satisfy total area ratios of the holes described in Table 1 below.

TABLE 1

| Section | Total area (%) of holes in the portion exposed in display region | | |
|---|---|---|---|
| | Conductive pad part | Dummy part | Position sensing line |
| Comparative Example 1 | 0 | 0 | Without exposed portion |
| Example 1 | 30 | 30 | Without exposed portion |
| Example 2 | 50 | 50 | Without exposed portion |
| Example 3 | 80 | 80 | Without exposed portion |

EXAMPLE 4

As illustrated in FIG. 10, a touch panel was manufactured by enlarging a display region A during manufacturing the touch panel so that a portion of the conductive pad parts 50, the dummy parts 80 (formed of Ag (a core part)) and the position sensing lines 40 were respectively exposed in the display region A, and a plurality of holes 60 were formed in the conductive pad parts 50, the dummy parts 80 and the position sensing lines 40, respectively.

An ITO coating layer was formed on the conductive pad parts 50, the dummy parts 80 and the position sensing lines 40.

A total area ratio of the holes in the portion of the conductive pad parts 50 exposed in the display region A was 50%, relative to a total area of the exposed conductive pad parts 50, and a total area ratio of the holes in the portion of the position sensing lines 40 exposed in the display region A was 16.7%, relative to a total area of the exposed position sensing lines 40.

EXAMPLES 5 TO 7 AND REFERENCE

Touch panels were manufactured according to the same procedures as described in Example 4, except that the holes thereof were formed so as to satisfy total area ratios described in Table 2 below.

TABLE 2

| Section | Total area (%) of holes in the portion exposed to display region | | |
|---|---|---|---|
| | Conductive pad part | Dummy part | Position sensing line |
| Reference | 50 | 50 | 0 |
| Example 4 | 50 | 50 | 16.7 |
| Example 5 | 50 | 50 | 25 |
| Example 6 | 50 | 50 | 50 |
| Example 7 | 50 | 50 | 75 |

Test Procedure

1. Evaluation of Visibility 10 test panels visually observed the touch panels manufactured according to the above-described examples and comparative example to determine whether the conductive pad parts, dummy parts or the position sensing lines exposed in the display region were viewed, and the number of the test panels determining to view the above parts were counted and listed in Table 3 below.

2. Evaluation of Conductivity

Conductivity of the touch panels manufactured according to the above-described examples and comparative example was measured. In particular, in a case of Examples 1 to 3, a contact resistance between the core part of the conductive pad part and the ITO coating layer was measured, and in a case of Examples 4 to 7, a channel resistance including the position sensing lines and the ITO coating layer was measured.

Rates of increase in an average resistance (%) of the touch panels in examples 1 to 3 compared to the touch panel in Comparative Example 1 without holes formed in the conductive pad parts and the dummy parts were measured, and rates of increase in an average resistance (%) of the touch panels in examples 4 to 7 compared to the Reference were measured. The results are listed in Table 3 below.

TABLE 3

| Section | Visibility (persons) | Evaluation of conductivity (Rate of increase in average resistance (%)) | |
|---|---|---|---|
| | | Conductive pad part | Position sensing line |
| Comparative Example 1 | 10 | 0% | — |
| Example 1 | 5 | 0.055% | — |
| Example 2 | 2 | 0.005% | — |
| Example 3 | 0 | 0.0455% | — |
| Reference | 10 | — | 0% |
| Example 4 | 5 | — | 1.3% |
| Example 5 | 4 | — | 1.9% |
| Example 6 | 3 | — | 3.8% |
| Example 7 | 1 | — | 5.8% |

Referring to the above Table 3, it could be seen that all the touch panels in the examples having the holes formed therein according to the present invention had significantly reduced visibility of the conductive pad parts and the position sensing lines exposed in the display region.

Further, the rates of increase in the average resistance of the conductive pad parts in the touch panels according to the examples were in a range of 0.005% to 0.055%, which is an insignificant level that has no effect on driving of the display, and may not be regarded as decreasing conductivity. The rates of increase in the average resistance of the position sensing lines were in a range of 1.3% to 5.8%, which is a level that may not be regarded as decreasing conductivity. Therefore, it can be seen that the touch panels in the examples having the holes formed therein according to the present invention may improve the visibility without deteriorating an electrical connection.

However, the touch panels of the Comparative Example 1 had a proper conductivity, but the conductive pad parts and the position sensing lines exposed in the display region were viewed.

Although the present invention has been described with reference to exemplary embodiments for illustrative purposes, the present invention is not limited to the specific embodiments but should be construed according to the accompanying claims. In addition, those skilled in the art will appreciate that various modifications, additions and substitutions are possible, without departing from the scope and spirit of the invention as disclosed in the accompanying claims.

What is claimed is:

1. A touch panel having a display region and a non-display region, the touch panel comprising:
   touch sensing electrode pattern formed in the display region;
   conductive pad parts each having a first part exposed in the display region and a second part formed in the non-display region, the conductive pad parts having a plurality of holes formed in at least the first part; and
   position detecting lines connected to the touch sensing electrode patterns via the conductive pad parts to transfer a sensing signal to an external circuit,
   wherein the first part of the conductive pad parts is connected with the touch sensing electrode patterns, and, the second part of the conductive pad parts is connected with the position sensing lines.

2. The touch panel according to claim 1, wherein the plurality of holes are arranged in rows.

3. The touch panel according to claim 2, wherein the plurality of holes are regularly or irregularly arranged.

4. The touch panel according to claim 1, wherein a total area of the plurality of holes in the first parts of the conductive pad parts is 30% to 90%, relative to a total area of the first parts of the conductive pad parts.

5. The touch panel according to claim 1, wherein the conductive pad part includes a groove.

6. The touch panel according to claim 5, wherein the groove is formed in rows.

7. The touch panel according to claim 6, wherein the groove is formed along a plurality of holes arranged in rows.

8. The touch panel according to claim 1, wherein the conductive pad part is formed of a material including at least one of a metal, a conductive metal oxide, and a conductive carbon.

9. The touch panel according to claim 1, wherein the conductive pad part includes a metallic core part and a conductive nonmetallic coating layer formed on the metallic core part.

10. The touch panel according to claim 9, wherein the metallic core part is formed to include a plurality of layers.

11. The touch panel according to claim 9, wherein the conductive nonmetallic coating layer is formed to include a plurality of layers.

12. The touch panel according to claim 1, wherein the conductive pad part further includes an insulation layer on an upper side thereof.

13. The touch panel according to claim 12, wherein the insulation layer is formed to include a plurality of layers.

14. The touch panel according to claim 1, wherein a portion of the position sensing lines is exposed in the display region, and the other portion of the position sensing lines is formed in the non-display region, and the position sensing lines have a plurality of holes formed in at least a region including the exposed portion thereof.

15. The touch panel according to claim 1, further comprising dummy parts adjacent to the conductive pad parts, wherein a portion of the dummy parts is exposed in the display region, and a plurality of holes are formed in at least a region including the exposed portion thereof.

16. An image display device comprising the touch panel according to claim 1.

17. The image display device according to claim 16, wherein the image display device is selected from the group consisting of a liquid crystal display (LCD), field emission display, plasma display panel, organic light emitting diode and a touch screen.

* * * * *